United States Patent [19]

Miyawaki

[11] Patent Number: 5,046,576
[45] Date of Patent: Sep. 10, 1991

[54] CONTROL SYSTEM FOR A TRANSFER DEVICE OF A FOUR-WHEEL DRIVE VEHICLE WITH A CONTINUOUSLY VARIABLE BELT-DRIVE TRANSMISSION

[75] Inventor: Motohisa Miyawaki, Nakanoshima, Japan

[73] Assignee: Fuji Juokogyo Kabushiki Kaisha, Tokyo, Japan

[21] Appl. No.: 419,733

[22] Filed: Oct. 11, 1989

[30] Foreign Application Priority Data

Oct. 17, 1988 [JP] Japan .................. 63-261112

[51] Int. Cl.$^5$ .................................... B60K 17/34
[52] U.S. Cl. ...................... 180/233; 180/247; 180/248; 180/250
[58] Field of Search ........... 180/233, 247, 248, 250; 192/46, 48.92, 51, 87.12

[56] References Cited

U.S. PATENT DOCUMENTS

| | | | |
|---|---|---|---|
| 4,705,134 | 11/1987 | Kitade | 180/247 |
| 4,711,318 | 12/1987 | Kitade | 180/247 |
| 4,805,718 | 2/1989 | Iwata et al. | 180/233 |

FOREIGN PATENT DOCUMENTS 61-249834 11/1986 Japan .

Primary Examiner—Mitchell J. Hill
Attorney, Agent, or Firm—Martin A. Farber

[57] ABSTRACT

A control system for a four-wheel drive vehicle with a continuously variable transmission having a drive pulley having a hydraulically shiftable disc and a hydraulic cylinder for operating the disc, a driven pulley having a hydraulically shiftable disc and a hydraulic cylinder, and a pressure regulator valve for regulating pressure of oil supplied to the hydraulic cylinders. A hydraulic actuator is provided for engaging a transfer clutch for establishing four-wheel driving. The pressure regulator valve has a pressure level changing port to increase the pressure of oil supplied to the cylinders. A solenoid operated valve is provided for supplying the oil regulated by the pressure regulator valve to the hydraulic actuator and to the pressure level changing port or for draining the actuator and the port. An orifice is provided in an inlet side of the solenoid operated valve. When the four-wheel driving is selected, the solenoid operated valve is energized to supply the regulated oil to the hydraulic actuator to establish the four-wheel driving.

5 Claims, 5 Drawing Sheets

CONTROL SYSTEM FOR A TRANSFER DEVICE OF A FOUR-WHEEL DRIVE VEHICLE WITH A CONTINUOUSLY VARIABLE BELT-DRIVE TRANSMISSION

BACKGROUND OF THE INVENTION

The present invention relates to a control system for four-wheel drive vehicles with a continuously variable belt-drive transmission, and more particularly to a system for controlling a transfer device for four-wheel drive vehicles.

A four-wheel drive vehicle of the type in which a transfer clutch is provided for transmitting the output torque of the transmission to auxiliary drive wheels is known. In such a vehicle, a power transmission train can be converted from two-wheel drive to four-wheel drive by engaging the transfer clutch. The continuously variable transmission (CVT) is provided with an oil supply source for controlling the transmission ratio, and hence a hydraulic transfer clutch which is operated by pressurized oil supplied from the oil supply source is provided for the four-wheel drive transmission system.

Japanese Patent Application Laid-Open 61-249834 discloses a four-wheel drive vehicle in which a transfer clutch in the form of a fluid operated multiple-disk friction clutch is employed. The line pressure for controlling the transmission is controlled in dependency on driving conditions, and the pressure is applied to the transfer clutch for controlling the transmitted torque for the rear drive wheels in the four-wheel drive mode.

However, the line pressure is supplied to servo devices of the transmission for preventing a drive belt of the transmission from slipping on the pulley of the transmission. When the line pressure is applied to the transfer clutch, the amount of oil is reduced, resulting in a decrease of the line pressure in a moment. The reduction of the line pressure causes the belt to slip. Therefore, it is necessary to provide a device for preventing the line pressure from decreasing at the engagement of the transfer clutch.

Further, there is a problem that when the transfer clutch is engaged in heavy load driving, an extremely large torque is transmitted in the auxiliary power transmission system, which causes a shock in the system and belt slipping.

SUMMARY OF THE INVENTION

The object of the present invention is to provide a control system which prevents the line pressure from decreasing at the engagement of the transfer clutch and inhibits the clutch engagement during heavy load driving.

According to the present invention, there is provided a control system for a four-wheel drive vehicle with a continuously variable transmission for transmitting the power of an automotive engine to wheels of a motor vehicle, the transmission having a drive pulley having a hydraulically shiftable disc and a hydraulic cylinder for operating the disc, a driven pulley having a hydraulically shiftable disc and a hydraulic cylinder for operating the disc, and a belt engaged with both pulleys, the system comprising a hydraulic circuit having a pressure regulator oil valve for regulating pressure of oil supplied to the hydraulic cylinders, the pressure regulator valve having a spool slidably mounted in a valve body for regulating the pressure of oil supplied to the cylinders, the vehicle having a transfer clutch for transmitting the output of the transmission to auxiliary drive wheels of the vehicle, a hydraulic actuator for engaging the transfer clutch, and a transfer valve provided for changing an oil passage for the hydraulic actuator for operating the hydraulic actuator.

The system comprises the pressure regulator valve having a pressure level changing port, the pressure of oil in which controls the pressure of oil supplied to the cylinders, a solenoid operated valve provided for supplying the oil regulated by the pressure regulator valve to the hydraulic actuator through the transfer valve and to the pressure level changing port or for draining the actuator and the port, first means for operating the transfer valve for selecting two-wheel driving or four-wheel driving, second means responsive to the four-wheel drive selecting operation of the first means for actuating the solenoid operated valve, thereby engaging the transfer clutch for providing the four-wheel drive.

In an aspect of the invention, the first means comprises a solenoid for operating the transfer valve, and a 4WD switch for energizing the solenoid, and the second means is a control unit.

The system has detector means for detecting a heavy load condition of the engine, the, control unit being responsive to the heavy load detection for de-energising the solenoid operated valve thereby inhibiting the providing of the four-wheel drive.

The other objects and features of this invention will become understood from the following description with reference to the accompanying drawings.

DETAILED DESCRIPTION OF THE PREFERRED EMBODIMENT

Figure 1A:
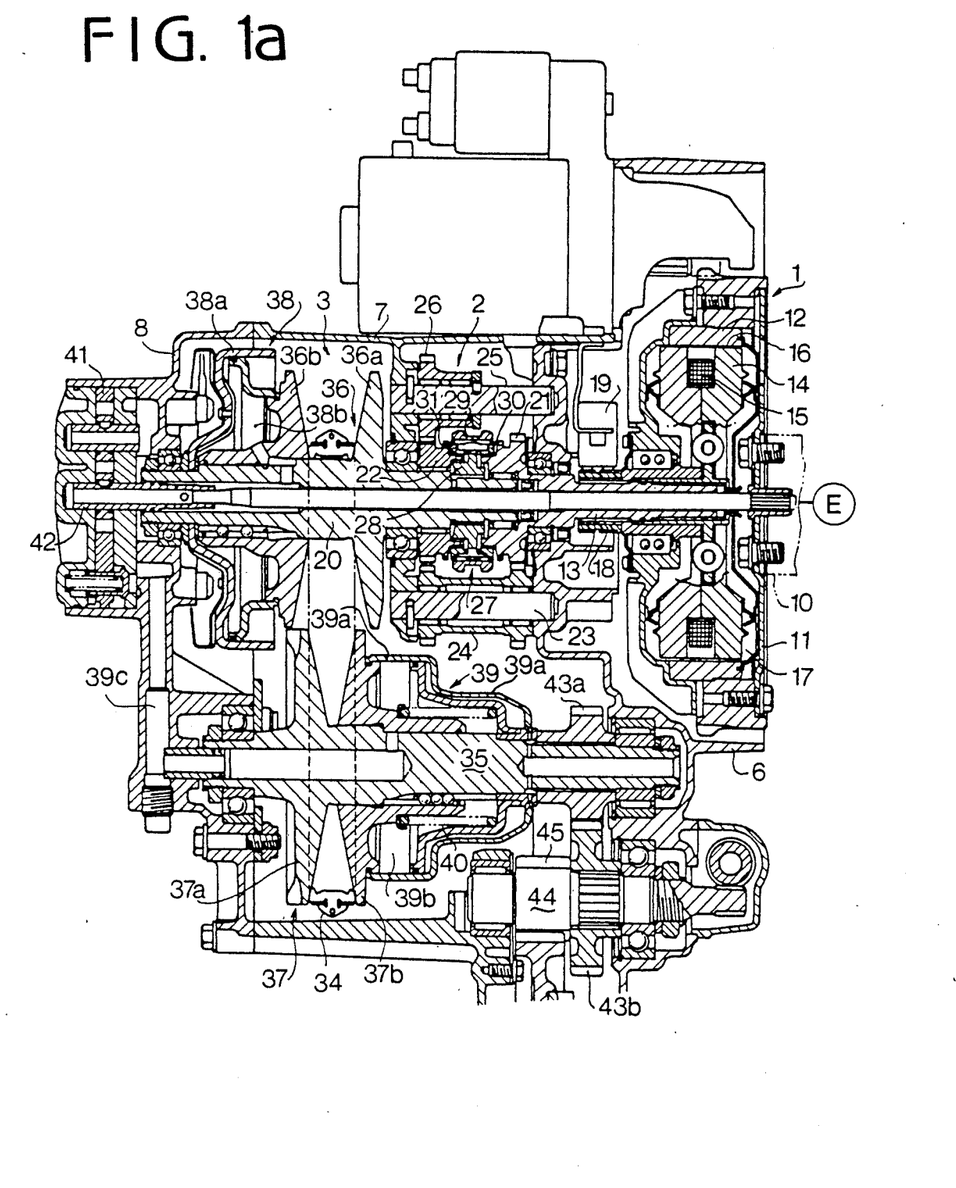
FIGS. 1a and 1b are sectional views showing a continuously variable belt-drive transmission for a four-wheel drive vehicle to which the present invention is applied.
Figure 1B:
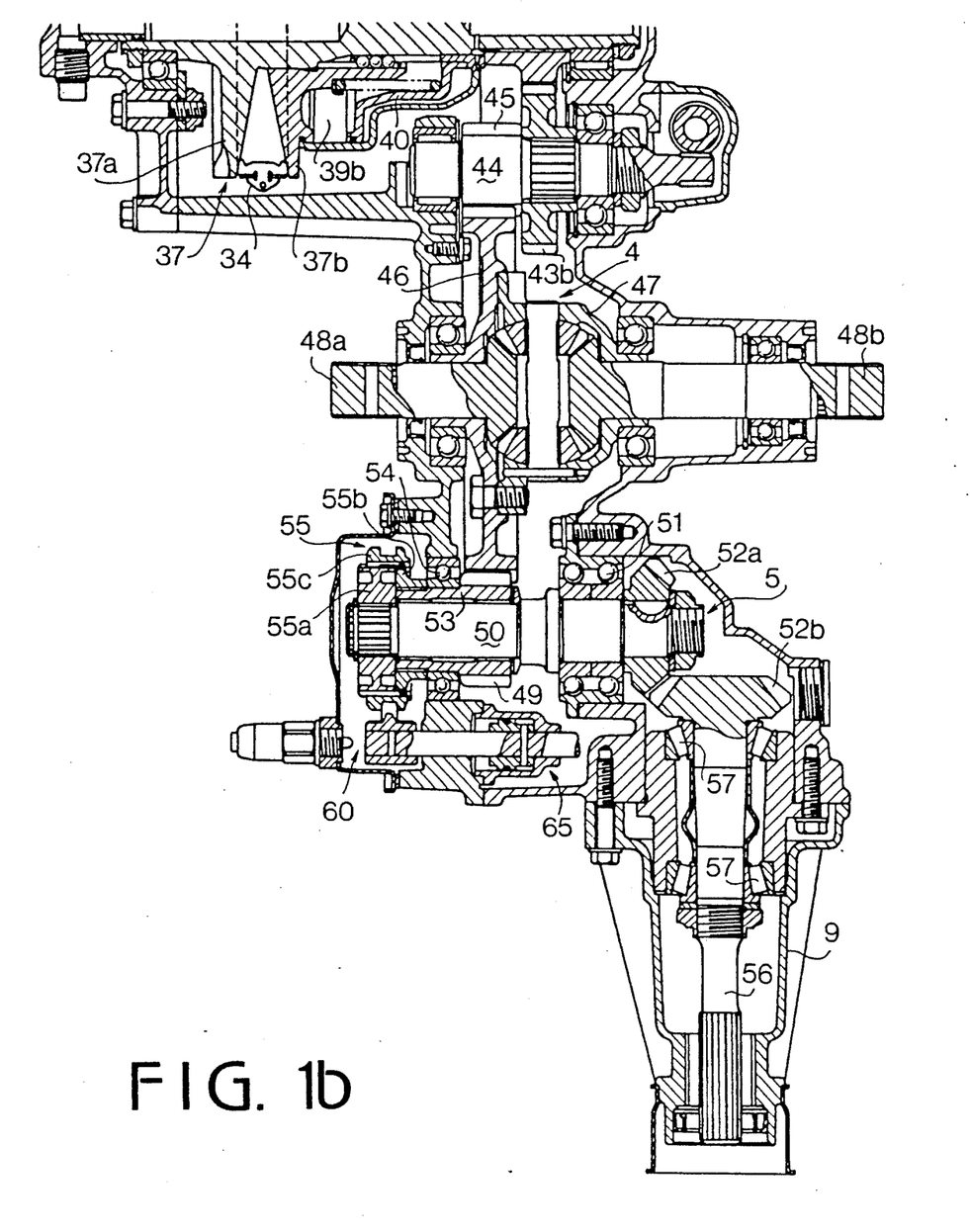

FIGS. 1a and 1b show a four-wheel drive power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a selector device 2, a continuously variable belt-drive transmission 3, a differential 4 for front wheels of the vehicle, and a transfer device 5. The electromagnetic powder clutch 1 is provided in a housing 6. The selector device 2, transmission 3, differential 4 and transfer device 5 are provided in a main housing 7 and a side housing 8. An extension case 9 is secured to the main housing 7. A crankshaft 10 of the engine E is connected to an annular drive member 12 through a drive plate 11 of the electromagnetic powder clutch 1. The electromagnetic powder clutch 1 comprises a driven member 14, and a magnetizing coil 15 provided in the driven member 14. The driven member 14 has its outer periphery spaced from the inner periphery of the drive member 12 by a gap 16. Magnetic powder material is provided in the gap 16. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited with clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 2 is provided between the input shaft 13 and a main shaft 20. The main shaft 20 is cylindrical and is disposed coaxially with the input shaft 13. The selector device 2 comprises a drive gear 21 integral with the input shaft 13, a reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) or a parking position (P range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D, $D_S$ ranges). When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. In the transmission 3, an output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b also slides in a cylinder 39a secured to the output shaft 35 to form a servo device 39. A chamber 39b of the servo device 39 is communicated with an oil pump 41 through a passage 39c. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43a which engages with an intermediate reduction gear 43b on an intermediate shaft 44. An intermediate gear 45 on the shaft 44 engages with a final gear 46. Rotation of the final gear 46 is transmitted to axles 48a and 48b of front driving wheels of the vehicle through a differential 47.

The transfer device 5 comprises a transfer gear 49 engaged with the final gear 46 and rotatably mounted on a transfer shaft 50 which is transversely disposed and rotatably supported in the extension case 9 by a bearing 51 and a bearing 54 outside of the transfer gear 49 through a boss 53 of the gear 49. Securely mounted on a right end portion of the transfer shaft 50 is a drive bevel gear 52a at the outside of the bearing 51 in the form of a cantilever. The bevel gear 52a is in mesh with a driven bevel gear 52b formed on a rear drive shaft 56 supported in the case 9 by a bearing 57 and disposed substantially on a center line with respect to the width of the body of the vehicle.

On a left end portion of the transfer shaft 50, a transfer clutch 55 of a claw clutch type is provided for providing a four wheel drive mode. The transfer clutch 55 is in the form of a synchromesh device and comprises a clutch gear 55b splined to boss 53 of the transfer gear 49, a hub 55a splined to the transfer shaft 50, and a synchronizer sleeve 55c mounted on the hub 55a for selectively engaging with the clutch gear 55b. Thus, the rotation of the gear 49 is transferred to rear drive wheels through the transfer clutch 55, the shaft 50, the bevel gear 52a secured to the shaft 50, the bevel gear 52b engaged with the bevel gear 52a and rear drive shaft 56.

An actuating device for the transfer clutch 55 of the transfer device 5 is described hereinafter with reference to FIGS. 2a and 2b.

Figure 2A:
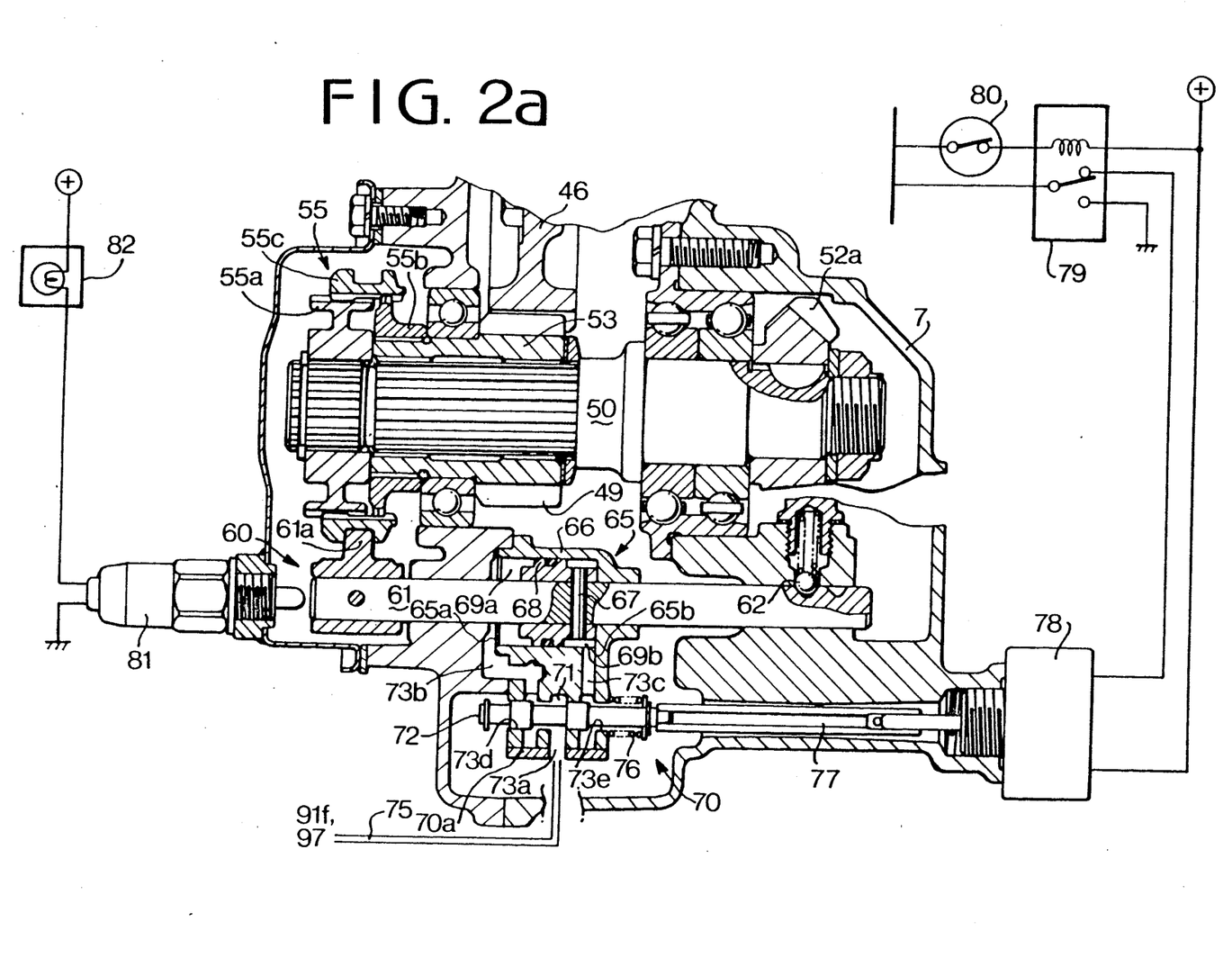
FIGS. 2a and 2b are schematic views showing a transfer device and a hydraulic control circuit thereof according to the present invention.
Figure 2B:
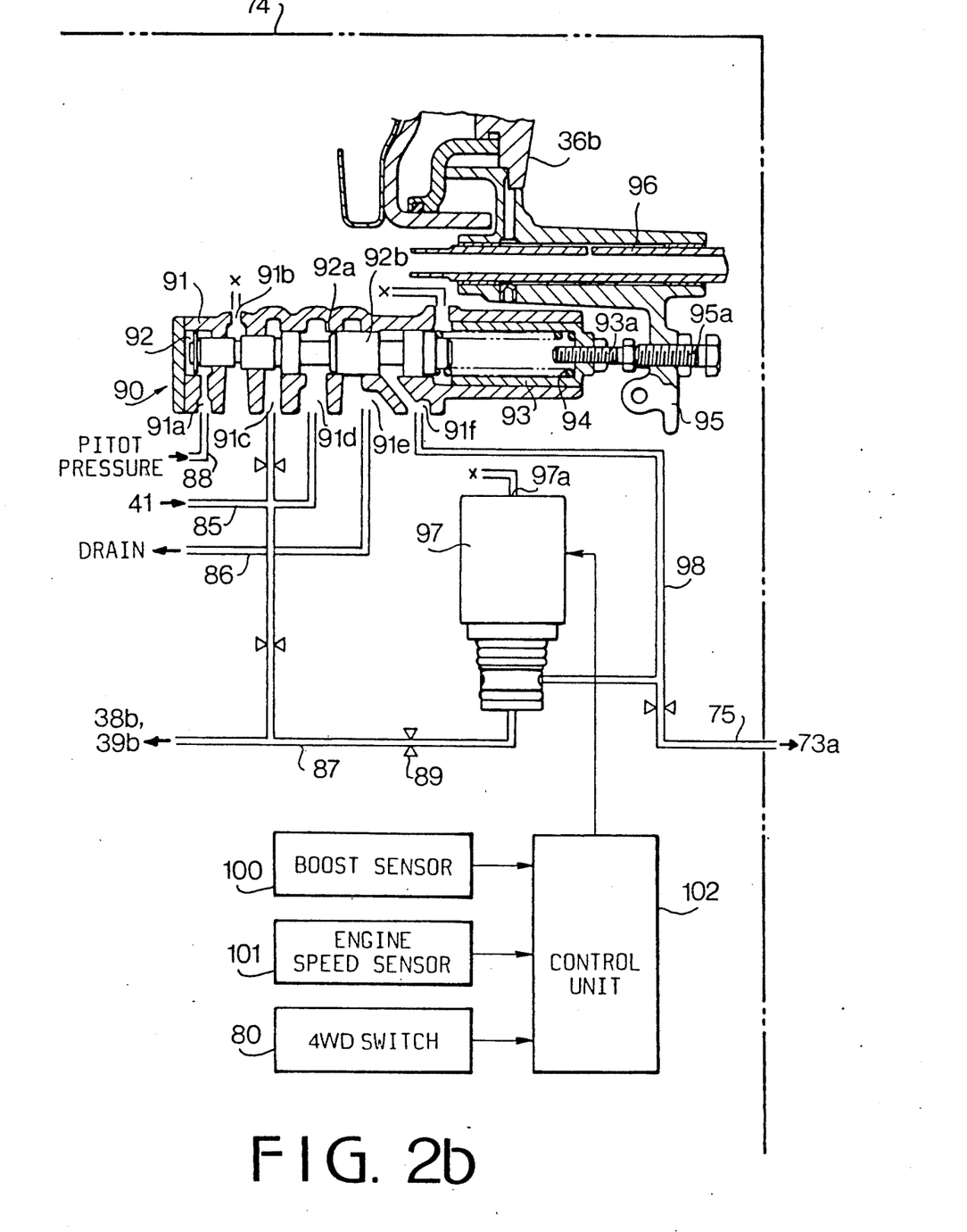

Referring to FIG. 2a, a hydraulic actuator 60 for operating the transfer clutch 55 comprises a servo actuator 65 and a transfer valve 70 provided in the main case 7.

The servo actuator 65 comprises a cylinder 66, a shifter rod 61 slidably mounted in the cylinder 66, and a piston 68 securely mounted on the rod 61 in the cylinder 66. The shifter rod 61 is disposed in parallel with the transfer shaft 50. A fork 61a engaging with the synchronizer sleeve 55c of the transfer clutch 55 is secured to an end of the rod 61. At the other end of the rod 61, a lock ball 62 is provided for positioning the rod in the two-wheel drive position or four-wheel drive position. The cylinder 66 has a chamber 69a with a first part 65a and a chamber 69b (with a second part 65b) defined by the piston 68.

The transfer valve 70 comprises a valve body 70a, a spool 72 having two lands, and a return spring 76 urging the spool 72 to the right. An end of the spool 72 is engaged with a rod 77 operatively connected to a solenoid 78. The valve body 70a has an inlet port 73a communicating with a line pressure conduit 75, a pair of outlet ports 73b, 73c, and a pair of drain ports 73d, 73e. The inlet port 73a selectively communicates with one of the ports 65a, 65b of the chambers 69a and 69b of the cylinder 66 through the corresponding one of the outlet ports 73b and 73c in accordance with the position of the respective land of the spool 72. At the same time, the another one of the outlet ports 73c and 73b communicates with the corresponding one of the drain ports 73e and 73d, respectively.

An electric power source is connected to the solenoid 78 and further connected to a contact of a relay 79, a coil of which is connected to a 4WD switch 80. A lamp switch 81 is provided adjacent the end of the rod 61 and a 4WD lamp 82 is connected to the switch 81.

A hydraulic control circuit 74 for converting the two-wheel drive system to the four-wheel drive system will be explained hereinafter with reference to FIG. 2b. The hydraulic control circuit 74 comprises a pressure regulator valve 90, a solenoid operated three-way valve 97 and a control unit 102. Oil in an oil reservoir is supplied to the pressure regulator valve 90 through a passage 85 by the pump 41 (FIG. 1). The pressure regulator valve 90 controls the amount of drain oil to a drain passage 86, thereby regulating the pressure of oil which is supplied to a passage 87. The passage 87 communicates with chamber 38b of the servo device 38 through a transmission ratio control valve (not shown) and directly communicates with the chamber 39b of the servo device 39. The transmission ratio of the transmission is controlled by the operation of the transmission ratio control valve in accordance with driving conditions.

The pressure regulator valve 90 comprises a valve body 91, spool 92, and spring 94 provided between a spring retainer 93 and one end of the spool 92 for urging the spool to the left.

A sensor shoe 95 for detecting the actual transmission ratio is slidably mounted on a lubricating oil pipe 96 which is parallel with the axis of the spool 92. A bolt 95a secured to an end of the sensor shoe 95 engages with an end of a bolt 93a secured to the spring retainer 93, and the other end of the sensor shoe 95 engages with an outside periphery of the movable disc 36b. Thus, the position of the movable disc 36b which means the transmission ratio during the operation is transmitted to the spool 92 through the spring 94. At the end of the valve body 91, opposite to the spring 94, the pitot pressure is applied to an end chamber 91a through a passage 88, and oil pressure is applied to port 91c through the passage 87. A port 91b which is provided between the chamber 91a and the port 91c for preventing the leakage of the oil dependent on the line pressure, communicates with the oil reservoir through drain passages. A port 91d communicates with a drain port 91e through a chamfer 92a formed on a land 92b of the spool 92 when the spool is shifted to the right, so that the line pressure can be regulated. A line pressure level changing port 91f provided adjacent the port 91e communicates with the passage 87 through a passage 98 and a solenoid operated change-over valve 97. The solenoid operated valve 97 is a three-way valve provided to selectively communicate the passage 87 with the port 91f. When a solenoid of the valve 97 is energized, the line pressure is applied to the port 91f through the valve 97 and passage 98, and the passage 98 is drained from a drain port 97a when the solenoid is de-energized.

The elastic force of the spring 94 increases corresponding to the transmission ratio. The elastic force operates to increase the line pressure. The line pressure applied to the ports 91c and 91f operates to decrease the line pressure. Thus, the line pressure is controlled. The pitot pressure applied to the end chamber 91a operates to adjust the line pressure in accordance with the engine speed.

Designating the difference between pressure receiving areas of the spool 92 at the port 91c as $A_L$ and the difference between pressure receiving areas at the pressure level changing port 91f as $A_C$, the relationship between the line pressure $P_L$ and the spring force F exerted by the spring 94 when the solenoid operated valve 97 is not energized to drain the oil at the port 91f is expressed as follows.

$$A_L \times P_L = F$$

Figure 3:
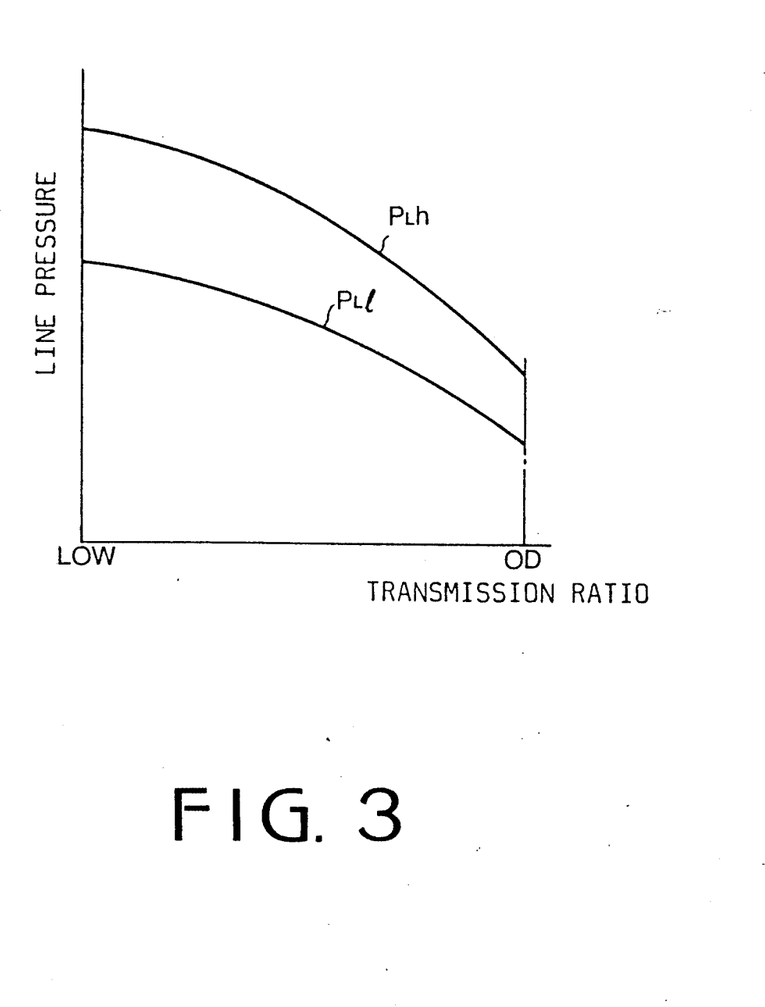
FIG. 3 is a graph showing the relationship between line pressure and transmission ratio.

Thus, the line pressure $P_L$ is controlled in accordance with the equation of $P_L = F/A_L$ to a higher value PLh as shown in FIG. 3. When the solenoid of the solenoid operated valve 97 is energized to apply the oil to the port 91f, the relationship is expressed as $$(A_L + A_C) \times P_L = F$$

Thus, the line pressure $P_L$ is controlled to a lower value PLl in accordance with $P_L = F/(A_L + A_C)$ as shown in FIG. 3. Thus, the line pressure is controlled by the force of the spring 94 which varies with the transmission ratio. Further, the line pressure is controlled by the solenoid operated valve 97 to a high level and a low level to provide a proper compressive force on the pulleys.

The solenoid operated valve 97 is energized or de-energized in accordance with a signal from the control unit 102 which is applied with output signals from a boost sensor 100 provided in an intake passage of the engine, an engine speed sensor 101 and the 4WD switch 80. In ordinary driving at a small engine torque below a predetermined value, the solenoid operated valve 97 is energized to decrease the line pressure. At heavy load with a large engine torque, the valve 97 is de-energized to increase the line pressure. The line pressure from the solenoid operated valve 97 is applied to the actuator 65 through the passage 75 and the transfer valve 70. An orifice 89 is provided in the passage 87 at the input of the solenoid operated valve 97.

If the passage 87 communicates with the passage 75 for applying the line pressure to the actuator 65, and the engine torque is less than the predetermined value, it is possible to convert the transmission system between the two-wheel drive and the four-wheel drive. When the line pressure is applied to the actuator 65 through the transfer valve 70, the line pressure decreases because of decrease of the amount of oil. In accordance with the present invention, the pressure regulator valve 90 operates to increase the line pressure in the passage 87 as described hereinafter. When the engine torque exceeds the predetermined value, the passage 98 is drained by the solenoid operated valve 97. Accordingly, it is impossible to convert the transmission system between the two-wheel drive and the four-wheel drive.

The operation of the system is described hereinafter. While the vehicle is at a stop, the driven pulley servo chamber 39b is supplied with the line pressure and the drive pulley servo chamber 38b is drained. Thus, the drive belt 34 engages with the drive pulley 36 at a minimum running diameter to provide the largest transmission ratio (low speed stage).

When the drive range is selected, the input shaft 13 and the main shaft 20 are connected to each other in the selector device 2. When the accelerator pedal is depressed, the electromagnetic powder clutch 1 is excited by a clutch current, transmitting the engine power to the drive pulley 36. As the engine speed rises, the pressure in the drive pulley servo chamber 38b increases so that the drive belt 34 engages with the drive pulley 36 at a larger running diameter to upshift the transmission. The transmitted power is transmitted to the differential 4 through output shaft 35, gears 43a and 43b, and intermediate shaft 44.

During ordinary driving in a light or middle load condition, the solenoid operated control valve 97 is energize in accordance with a 4WD enabling signal from the control unit 102. The line pressure is applied from the passage 87 to the port 91f of the pressure regulator valve 90 through the valve 97 so that the line pressure is controlled to the low line pressure PL1. The low line pressure of the passage 98 is applied to the port 73a of the transfer valve 70 through the passage 75. Thus, it is possible to convert the transmission system between the two-wheel drive system and the four-wheel drive system.

When the 4WD switch 80 is turned off, the contact of the relay 79 is cut to de-energize the solenoid 78. Thus, the rod 77 is not shifted to the left. The spool 72 is shifted by the elastic force of the spring 76 to the right to communicate the inlet port 73a with the outlet port 73c and the outlet port 73b with the drain port 73d. The line pressure is applied to the chamber 69b of the servo actuator 65 through the outlet port 73c to shift the piston 68 and the rod 61 to the left in FIG. 2a. The synchronizer sleeve 55c on the hub 55a is disengaged from the clutch gear 55b. Accordingly, the power of the differential 4 is transmitted to the front wheels only, so that the two-wheel transmission system is established.

When the 4WD switch 80 is closed as shown in FIG. 2a, the solenoid 78 is energized so that the rod 77 is moved to shift the spool 72 to the left against the spring force. The inlet port 73a communicates with the outlet port 73b and the outlet port 73c communicates with the drain port 73e. The line pressure from the passage 75 is applied to the chamber 69a of the cylinder 66 so that the rod 61 is shifted to the right in FIG. 2a. Thus, the synchronizer sleeve 55c *is moved to the right to engage with the clutch gear 55b.* Accordingly, the transfer gear 49 engages with the transfer shaft 50 to transmit the power of the engine to rear drive wheels through the transfer device 5 and the rear drive shaft 56. Thus, the four-wheel drive system is established.

When the pressurized oil is supplied to the chamber 69a through the valve 97, the supply of the oil from the passage 87 is regulated by the orifice 89. Thus, the line pressure in the passage 87 is prevented from decreasing. Since the line pressure in the passages 98 and 75 is applied to the actuator 65, pressure of oil at the port 91f decreases in a moment because of the decrease of oil. The reduction of oil causes the spool 92 of the regulator valve 90 to shift to the left to temporarily increase the line pressure. Accordingly, the compressive force of the pulleys against the drive belt 34 increases. Consequently, the drive belt 34 is prevented from slipping.

The output signal of the 4WD switch 80 is also applied to the control unit 102 which produces a signal to de-energize the solenoid operated valve 97 to drain passage 98 through the valve 97. Thus, the spool 92 of the pressure regulator valve 90 is shifted to the left to increase the line pressure to the high level PLh. Consequently, a large compressive corresponding to the power of four-wheel drive is supplied to the pulleys, thereby prevented the belt 34 from slipping At that time, although the chamber 69a of the servo 65 is also drained, the lock ball 62 inhibits the rod 61 from axially moving so that the four-wheel drive is held.

When the 4WD switch 80 is turned off, the spool 71 of transfer valve 70 is changed to the two-wheel drive position. However, since the passage 75 is drained, the actuator 65 is not operated. When the control unit 102 detects a light or middle load condition in accordance with signals from the boost sensor 100 and the engine speed sensor 101, the control unit 102 produces a signal, so that the solenoid valve 97 is energized. Accordingly the line pressure in the passage 87 is applied to the chamber 69b to provide two-wheel drive. The line pressure is also applied to the port 91f to provide the low level line pressure. Thus, the line pressure goes to the low level with a delay, thereby preventing decrease of the line pressure at the conversion to the two-wheel drive.

When the control unit 102 detects a heavy load condition of the engine, the control unit produces a 4WD disabling signal, so that the solenoid operated valve 97 is de-energized. Accordingly, the passage 75 is drained through the valve 97 to reduce the pressure in the passage 75. Therefore, if the 4WD switch 80 is turned on or off, the actuator 65 is not operated, thereby preventing the conversion between the two-wheel driving and the four-wheel driving.

From the foregoing, it will be understood that the present invention provides a control system in which the line pressure for controlling the transmission ratio is used for converting the transmission system between the two-wheel drive mode and the four-wheel drive mode. Since, the line pressure is prevented from decreasing at the conversion of the transmission system, slipping of the drive belt on the pulleys is prevented.

During heavy load driving, the conversion of the transmission system is inhibited. Thus, various disadvantages such as a sudden increase of torque, decrease of the line pressure, and slipping of the drive belt can be prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a four-wheel drive vehicle with a continuously variable transmission for transmitting power of an automotive engine to main drive wheels of a motor vehicle, the transmission having a drive pulley including a hydraulically shiftable disc and a hydraulic cylinder for operating the disc, a driven pulley including a hydraulically shiftable disc and a hydraulic cylinder for operating the disc of the driven pulley, and a belt engaging with both of said pulleys, the control system comprising a transfer clutch engaged in a four-wheel drive condition of the vehicle for transmitting output of the transmission to auxiliary drive wheels of the vehicle, and respectively, disengaged in a two-wheel drive condition of the vehicle, and a hydraulic circuit including a pressure regulator valve having a valve body and a spool slidably mounted in the valve body for regulating line pressure of oil in the hydraulic circuit for the hydraulic cylinders of the pulleys of the transmission, an actuator with a first port and a second port, for selectively engaging the transfer clutch in response to oil pressure to be applied to the first and second ports, and a transfer valve with an inlet port for supplying oil from the inlet port to one of the first and second ports, the control system further comprising:

a line pressure level changing port formed on the pressure regulator valve for changing level of the line pressure in response to oil pressure applied thereto;

a conduit connecting the pressure level, changing port to the inlet port of the transfer valve;

a solenoid operated valve connected to the conduit for supplying the line pressure to the pressure level changing port in order to set the line pressure to a low level; and means for temporarily restricting supplying of the line pressure to the conduit for changing the line pressure to a high level in response to supply of oil in the conduit to the actuator through the transfer valve when a driving condition of the vehicle is changed between the four-wheel drive condition and the two-wheel drive condition, so as to prevent slipping of the belt on the pulleys.

2. The system according to claim 1, further comprising:

means comprising a manual switch for being operated for changing the driving condition of the vehicle; and means comprising a transfer solenoid for being energized for operating the transfer valve in response to a signal from the manual switch.

3. The system according to claim 1, wherein said restricting means is an orifice in an inlet side of the solenoid operated valve.

4. The system according to claim 1, wherein the solenoid operated valve includes a drain port for draining the line pressure applied to the pressure level changing port for setting the line pressure to the high level.

5. The system according to claim 1, further comprising:

lock means for locking the actuator at a two-wheel drive position and at a four-wheel drive position, respectively.

* * * * *